United States Patent [19]

Bowen, III

[11] 3,851,361
[45] Dec. 3, 1974

[54] METHOD OF FORMING SECTIONAL CRANKSHAFT

[76] Inventor: Willard L. Bowen, III, Village Ln., Harwinton, Conn. 06790

[22] Filed: July 13, 1973

[21] Appl. No.: 378,823

Related U.S. Application Data

[63] Continuation of Ser. No. 207,742, Dec. 14, 1971, abandoned.

[52] U.S. Cl. .......................................... 29/6, 74/598
[51] Int. Cl. .............................................. B21k 1/08
[58] Field of Search ................ 29/6, 445, 464, 522; 151/21 C, 19 R; 403/260, 258

[56] References Cited
UNITED STATES PATENTS

| | | | |
|---|---|---|---|
| 1,884,551 | 10/1932 | Bognton | 151/21 C |
| 2,151,624 | 3/1939 | Smith-Clarke | 74/598 |

FOREIGN PATENTS OR APPLICATIONS

| | | | |
|---|---|---|---|
| 397,135 | 8/1933 | Great Britain | 29/6 |

*Primary Examiner*—Andrew R. Juhasz
*Assistant Examiner*—Leon Gilden
*Attorney, Agent, or Firm*—Diller Brown Ramik & Wight

[57] ABSTRACT

This invention relates to a sectional crankshaft specially adapted to receive anti-friction bearings and with the journals thereof defining race surfaces for rolling elements of such bearings while permitting outer races of the bearings to be continuous. A particular feature of the sectional crankshaft is the joint construction thereof which permits the components of the crankshaft to be separated for the placement of anti-friction bearings on the journals thereof while at the same time providing a rigid assembly having the required torsional resistance. A further feature of the joints utilized in the sectional crankshaft is the simplicity thereof and the automatic alignment of the parts through such joints when the crankshaft is reassembled after being disassembled.

4 Claims, 5 Drawing Figures

PATENTED DEC 3 1974
3,851,361
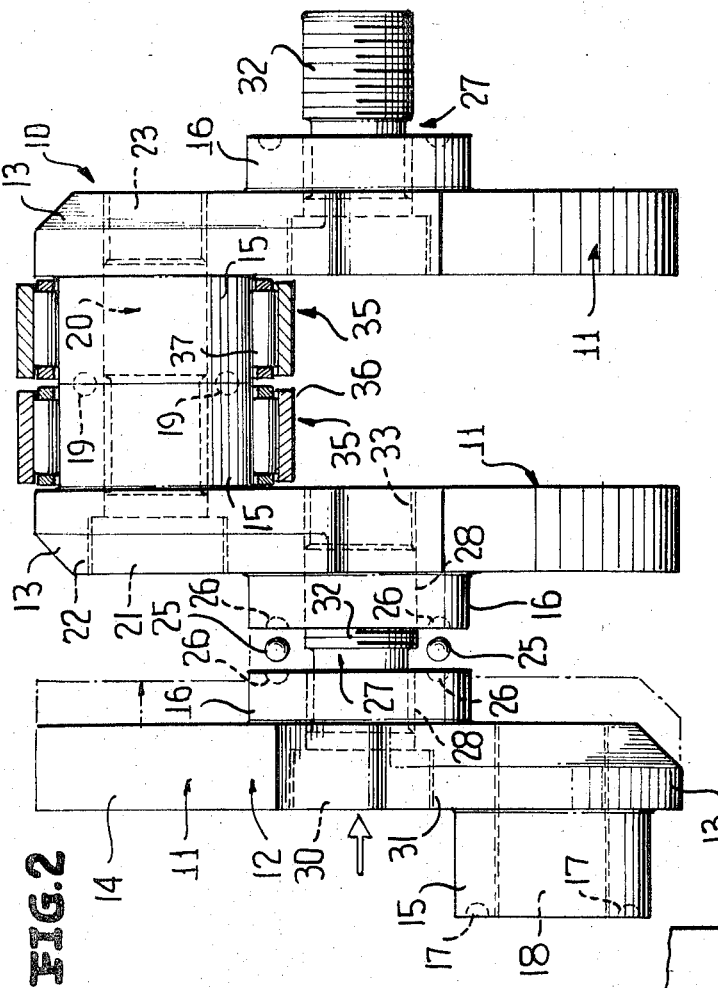
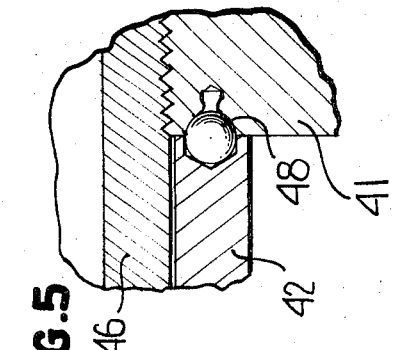
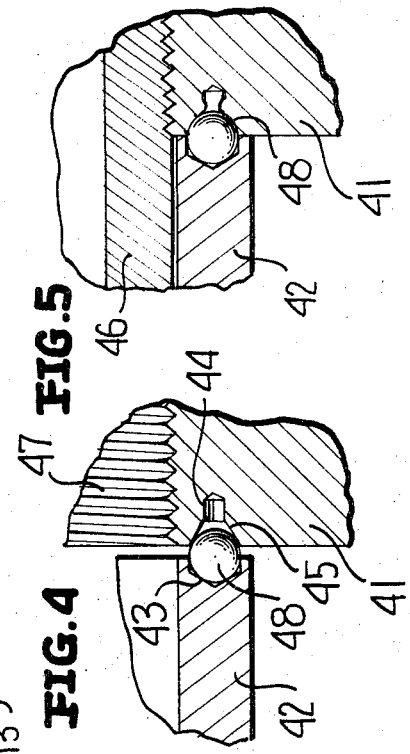
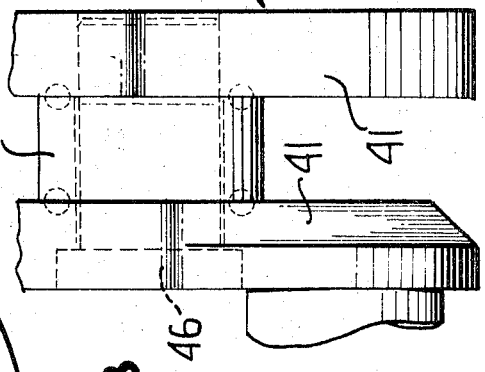
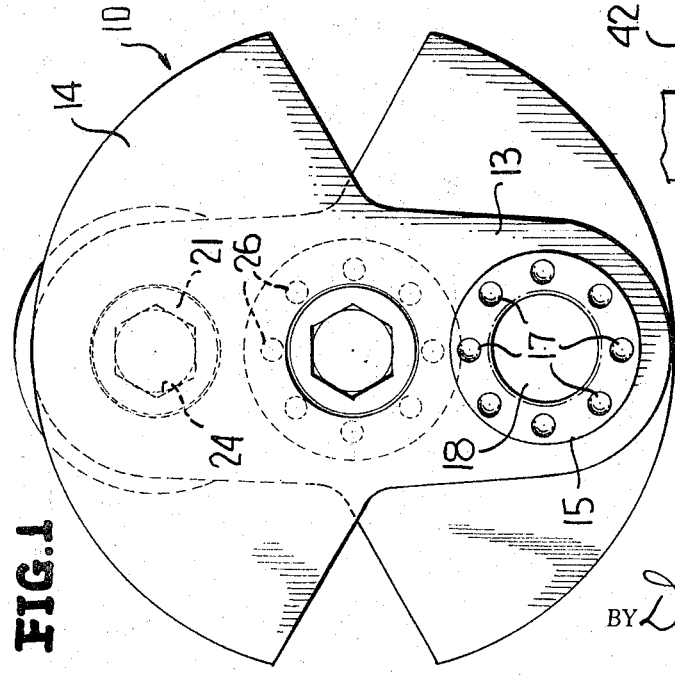
INVENTOR
WILLARD L. BOWEN, III
BY Diller, Brown, Ramik & Holt
ATTORNEYS 3,851,361

METHOD OF FORMING SECTIONAL CRANKSHAFT

This application is a continuation of my application Ser. No. 207,742, filed Dec. 14, 1971, now abandoned.

This invention relates in general to new and useful improvements in torque transmitting rigid joints, and more particularly to a sectional crankshaft and joints between components thereof.

BACKGROUND OF THE INVENTION

It has been known for years that the life expectancy of an internal combustion engine, the permissive speed of operation thereof and the efficiency thereof may be increased through the utilization of anti-friction bearings in lieu of the conventional friction type bearings which have been historically utilized. However, because of the expense involved, only limited types of internal combustion engines utilize anti-friction bearings in conjunction with the crank-shafts thereof although anti-friction bearings are used wherever possible in other vehicular components.

In relatively small, high speed internal combustion engines, such as outboard motor engines, chain saw engines, etc., it is known to utilize anti-friction bearings. This is permissive because normally the relatively short and limited number of journal crankshafts utilized therein are normally supported only at the opposite ends thereof. The bearings between the connecting rods and the rod journals of such crankshafts also utilize anti-friction bearings. These generally are in the form of needles or rollers rolling directly in contact with the journals and with the connecting rods. This, however, is possibly only when high quality, hardenable metals are utilized in the construction of the crankshafts and the connecting rods.

It is also well known in motorcycle and certain automobile engines to provide sectional crankshafts on which conventional types of anti-friction bearings may be assembled. However, these crankshafts are very expensive and must be factory assembled so that the desired angular relationship between the various journals may be assured. All of these crankshaft constructions are too expensive to be utilized in the internal combustion engines of the mass produced automobiles which are generally acceptable.

Attempts have been made to provide conventional automotive engine crankshafts with rolling bearing assemblies. In doing so, it is necessary that the journals be either hardened so that rollers may roll directly thereagainst, or the diameters of the journals reduced so that split inner race members may be installed thereon. Such bearings also require split outer race members. It was found that the metals of existing crankshafts cannot be sufficiently hardened to function as races, and the split bearing assemblies prove to be too costly and too impractical.

SUMMARY OF THE INVENTION

In accordance with this invention, it is proposed to form a sectional crankshaft wherein the components of the crankshaft are secured together in a releaseable manner by means of a novel joint. In accordance with this invention, abutting end portions of crankshaft components are provided with aligned recesses, and inserts, preferably in the form of hardened balls, are seated in these recesses while the end portions are clamped together by means of bolts extending through the general portions. The bolts provide only the tension force necessary to keep the components of the joints in engagement while the inserts maintain alignment and transmit radial and torsional loads.

With this novel joint construction, it is possible to form sectional crankshafts of two different types. In one type, the throws and counterweights are formed as flat plate units while the journals are furnished as thick walled tube sections of material capable of being hardened to the necessary hardness. The recesses are formed in the journals and in the throws in a predetermined pattern and then the elements of the crankshaft are bolted together by passing a headed bolt through one of the throws, through the journal and threaded into the other of the throws.

In another form of crankshaft construction, the throws have formed integrally therewith halves of both the main journals and rod journals with each journal being of a split construction and the joint being formed between the halves of each journal.

A further feature of the joint construction is that by providing a predetermined pattern of recesses in the parts to be joined, the desired angular relationship between components of the crankshaft may be automatically obtained by placing the components in substantially the desired position and then permitting the inserts to automatically effect the final alignment of the components.

With the above and other objects in view that will hereinafter appear, the nature of the invention will be more clearly understood by reference to the following detailed description, the appended claims and the several views illustrated in the accompanying drawing:

IN THE DRAWING:

FIG. 1 is an end elevational view of a partially assembled sectional crankshaft formed in accordance with this invention.

FIG. 2 is a side elevational view of the partial crankshaft of FIG. 1 and shows the manner in which the components are assembled.

FIG. 3 is a fragmentary view through a modified form of sectional crank utilizing the same type joint.

FIG. 4 is an enlarged fragmentary sectional view showing the details of a partially completed joint.

FIG. 5 is a view similar to FIG. 4 showing the completed joint.

Referring now to the drawings in detail, it will be seen that there is illustrated in FIGS. 1 and 2 a partially assembled crankshaft which is generally identified by the numeral 10. The crankshaft 10 is formed of a plurality of identical or substantially identical crankshaft components 11.

Each crankshaft component 11 includes a plate-like combined throw and counterweight portion 12 which is formed at one end as a throw part 13 and at the opposite end as a counterweight 14, as is clearly shown in FIG. 1. The throw part 13 has integrally formed therewith and projecting from one face thereof a rod journal half 15. The central portion of the combined throw and counterweight portion 12 has projecting from the opposite face thereof an integrally formed main journal half 16.

As is clearly illustrated in FIGS. 1 and 2, each rod journal half 15 is provided in the end face thereof with a plurality of equally circumferentially spaced recesses 17 which are preferably of a hemispherical configuration. The journal half 15 is also provided with a central bore 18 therethrough.

Referring now to the upper right-hand portion of FIG. 2, it will be seen that two journal halves 15 are secured together by means of balls 19 seated in the recesses 17 formed therein with the two journal halves 15 being clamped together by a bolt 20 passing therethrough. The bolt 20 is provided with a head 21 which is cylindrical and which is seated in a like configuration recess 22 in one of the throw parts 13. The bolt 21 freely passes through the one throw part 13, through the two rod journal halves 15 and into the other of the throw parts 13 where a threaded end 23 of the bolt 20 is threaded into the throw part 13. In order to facilitate the threading of the bolt 20 into the throw part 13 and the effective tightening thereof, the head 21 of the bolt 20 is provided with a socket 24 for receiving a suitable tool.

It is to be noted that the main journal halves 16 are secured together by interlocking hardened balls 25 seated in recesses 26 formed in the opposing ends thereof. The recesses 26, like the recesses 17 are of a hemispherical configuration. Further, as is clearly illustrated in FIG. 1, the recesses 26 are evenly spaced about the main journal halves 16. in accordance with this invention, the number of recesses 26 formed in each main journal half end is equal to a unit multiple of the total number of rod journals of the crankshaft. In the illustrated crankshaft there are eight recesses 26 in the end of each main journal half 16. This number of recesses is satisfactory for a four cylinder or an eight cylinder engine wherein the rod journals are disposed at an angle of 90° or 130° to one another. If the crankshaft 10 were to be a six cylinder crankshaft, the number of recesses 26 would normally be six although it is feasible to utilize a multiple of three, such as nine, in that in a six cylinder crankshaft the rod journals are disposed at an angle of 120° relative to one another. Thus, it might be truly said that the number of recesses 26 is a half unit multiple of the number of rod journals or a unit multiple of the number of rod journal angular locations.

The main journal halves 16 are secured together in the same manner as are the rod journal halves 15, that is by way of a bolt 27. The main journal halves 16 have bores 28 therethrough through which the bolt 27 freely passes. The bolt 27 has a head 30 which is cylindrical and which is seated in a like socket 31. The opposite end of the bolt 27 includes a threaded portion 32 which is suitably threaded in a threaded bore 33 in the other of the crankshaft components 11. When the bolt 27 is tightened down, the balls 25 will be seated within the recesses 26 and lock together the main journal halves 16.

At this time it is pointed out that for all practical purposes, the crankshaft components 11 are identical. They may be identical when initially formed and then selectively modified so as to have the bolt sockets and bolt threads formed in the respective portions thereof, or they may be provided in selected sets.

It is to be understood that the bolt provides only the tensile force necessary to keep the ball-joint in engagement. The ball-joint, which is formed by the balls seated in the recesses, transmit radial and torsional loads. Crankshafts so constructed have been found to have extremely good rigidity and has sufficient strength and torsional resistance to be utilized in engines for race cars wherein the strength requirements of crankshafts is much greater than those used in ordinary automobiles.

Referring once again to FIG. 2, it will be seen that the joined together rod journals 15 have mounted thereon conventional roller bearings, generally identified by the numeral 35, adapted to be clamped into large ends of conventional connecting rods. Each roller bearing 35 includes a one-piece outer race 36 adapted to be received in its end an associated connecting rod. Each roller bearing 35 also includes rollers 37 which directly roll upon the machined outer surface of the rod journal half 15 which has been machined for that purpose and which is sufficiently hardened to function as a race surface. The roller bearings 35 may be of the conventional full complement type or may be of the type provided with cages as is shown in FIG. 2.

Each main journal will also be provided with a conventional roller bearing for seating in the block of the internal combustion engine for which the crankshaft 10 is intended. If desired, the roller bearing for the main journal may be of the double row type so that each row of rollers will roll directly upon one main journal half 16. On the other hand, it is feasible to utilize a single row roller with the rollers bridging the two main journal halves 16.

In accordance with this invention, the components of the crankshaft 10 are all assembled after which the journal halves 15 and 16 are ground to size, like a conventional crankshaft, thus providing excellent accuracy and alignment of all bearing journals. The ground shaft is then disassembled, followed by the placing of the bearings on the journals and the reassembling of the shaft. It is to be understood that the customary crankshaft nose and flywheel mounting flange may be assembled on the crankshaft components 11 utilizing bolts with the added nose portion and flywheel hub (not shown) being interlocked with the main journal half 16 in the same manner as that illustrated and described herein.

Reference is now made to FIG. 3 wherein a modified form of crankshaft construction, generally identified by the numeral 40, is illustrated. In lieu of forming the journal components integral with the combined throw and counterweight elements, the journals are of a one-piece construction and the combined throw and counterweight are in the form of plates. While this constructions does not have the strength of the crankshaft 10, it is feasible for certain types of crankshaft usage and is much more inexpensive. In the first place, the combined throw and counterweight members, which are identified by the numeral 41, may be formed of less expensive metal and need not be hardened. In a like manner, the journals, which are identified by the numeral 42, may be formed of readily available tubing which may be readily hardened in advance of assembly with the combined throw and counterweight members 41.

With particular reference to FIGS. 4 and 5, it will be seen that the ends of the journal members 42 may have recesses 43 formed therein in the form of drilled bores.

In a like manner, the combined throw and counterweight member 41 may have formed in a face thereof a drilled bore 44 including a counterbore portion 45 which is conical.

In assembling the crankshaft members 41 and the journal member 42, a bolt 46, like the bolts 20 and 27, pass through one of the members 41, through the journal member 42 and is threaded into a threaded bore 47 of the other of the members 41 after hardened balls 48 are positioned within the recesses 43 and 45. When the bolt 46 is tightened down, the softer metal of the members 41 will deform in the area of the recesses 45, as is shown in FIG. 5, and there will be a perfect seating of the balls 48 therein to assure a perfect alignment of the journal member 42 with the combined throw and counterweight members 41.

The sectional crankshaft 40 may be assembled, machined and provided with bearings in the same manner described with respect to the crankshaft 10.

At this time it is also pointed out that the hardened balls 48 may be conventional ball bearings and therefore, are very inexpensive.

It is also pointed out here that the recesses 43 and 45 formed in the crankshaft members 41 and 42 will be uniformly oriented on the various members and will be of a number as described above with respect to the crankshaft 10 so that the desired angular relationship of the various components will be the predetermined relationship and will be automatically obtainable.

Although only two preferred embodiments of the sectional crankshaft in accordance with this invention have been specifically illustrated and described herein, it is to be understood that minor variations may be made therein without departing from the spirit and scope of the invention, as defined by the appended claims.

I claim:

1. A method of forming a sectional crankshaft having rod and main journals connected together by counterweights comprising the steps of forming elements of a conventional type crankshaft as individual components including counterweight portions and journal portions having aligned axial bores, providing screw threaded fasteners of a size to fit said bores for passage through aligned bores of respective counterweight and journal portions to clamp the same together, and forming torsion transmitting connections between clamped together counterweight and journal portions in circumferentially spaced relation; said method particularly including the steps of forming each of said torsion transmitting connections which includes forming axially aligned recesses in opposing surfaces of the crankshaft portions to be joined, at least one of said axially aligned recesses being formed of a shape other than cylindrical or part hemispherical, positioning a hardened ball between the crankshaft portions being joined in between and partially disposed in said axially aligned recesses, and then utilizing the associated screw threaded fastener to draw the respective crankshaft portions together and thereby forceably seating said ball in said axially aligned recesses with at least said one recess being distorted by the pressing of the ball thereinto to effect an automatic firm seating of the ball therein.

2. The method of claim 1 wherein said one recess is formed as a tapered bore.

3. The method of claim 1 wherein said recesses are formed as bores and at least said one bore recess is formed as a tapered bore.

4. The method of claim 3 wherein the other of said recesses is formed as a drilled cylindrical bore.

* * * * *